April 2, 1957          A. BRUEDER          2,787,474

ANTI-ROLLING DEVICE FOR VEHICLES

Filed April 12, 1954          3 Sheets-Sheet 1

United States Patent Office 2,787,474
Patented Apr. 2, 1957

2,787,474
ANTI-ROLLING DEVICE FOR VEHICLES

Antoine Brueder, Paris, France, assignor to Societe Anonyme Andre Citroen, Paris, France Application April 12, 1954, Serial No. 422,636

Claims priority, application France December 21, 1953

5 Claims. (Cl. 280—112)

Various known hydraulic systems make use of a pump sending a certain quantity of liquid to the heavier loaded side of the vehicle, while an equal quantity must be from the tank of the less loaded side. This process is difficult to carry out, and a large part of the power brought into play is uselessly expended.

The hydraulic process according to the invention consists of inserting a volumetric pump directly between the cylinders acting on the suspension springs of each right and left wheel of each axle assembly; this pump is only used to decant the liquid from the less loaded side towards the heavier loaded side. This process affords a maximum saving of power. The quantity of liquid removed from one side being strictly equal to the quantity sent into the other side, the balance of the vehicle is restored with accuracy.

The wheel supports of a vehicle bear on the chassis through the intermediary of hydraulic devices which are connected to each other and to a pump; this pump, according to its rotation direction, sends the liquid into one or other wheel support; according to another solution, this pump revolves in the same direction, but delivers into one or other support by means of a distributor such as a slide or rotary valve.

A detailed description will be hereinafter given of two forms of embodiment of the purpose of the invention by way of example, making reference to the diagrammatic drawing of Figures 1 and 2.

Figure 1:
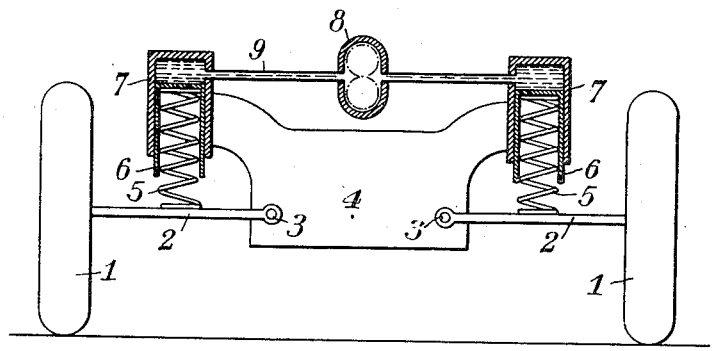

Figure 1 shows a diagram of the anti-rolling device on a set of vehicle wheels. The wheels 1 are mounted on the arms 2 jointed at 3 to the chassis 4. Springs 5 attached to the arms 2 bear on the chassis 4 through the intermediary of the piston 6 which slides in the cylinders 7. These cylinders containing a fluid are connected to a pump 8 by piping 9.

When the liquid has been filled up, if the pump 8 is turned in one direction or the other for a certain number of revolutions, the chassis 4 tilts to the right or left at a certain angle.

If, on the other hand, the chassis tilts under the action of an external force, by compressing the spring on one side and releasing the spring on the other, it is possible to restore the balance by revolving the pump in the requisite direction, and for a given number of revolutions.

Figure 2:
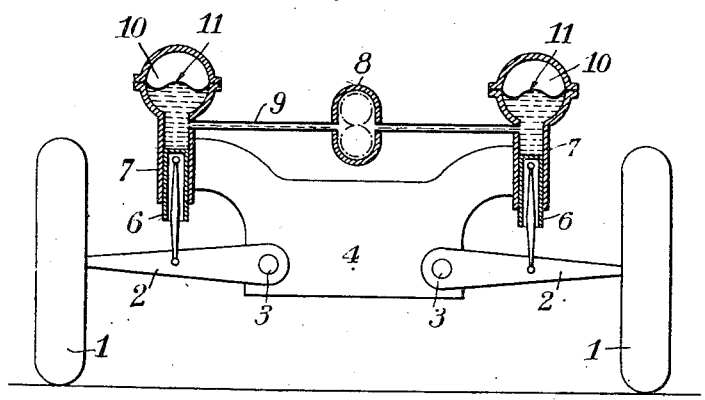

Figure 2 shows the application to a hydro-pneumatic suspension. We observe the piston 6 sliding in a cylinder 7 containing liquid and connected with a recipient 10 containing a compressed gas separated from the liquid by a flexible membrane 11. The working is identical to the previous case.

Starting up the pump at the desired moment, in the direction and during the requisite time, can be done in various manners, by means that are known at present.

The pump can also continuously revolve in a given direction and be put into circuit in the desired flowing direction and during the time required for restoring the balance, by using a hydraulic distributor such as a slide or rotary valve.

Figure 3:
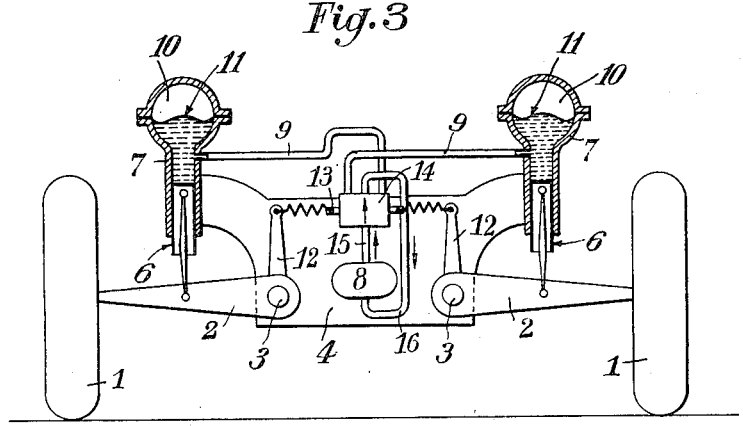
Figures 3 and 4 show the working of a device with a distributor slide-valve.
Figure 4:
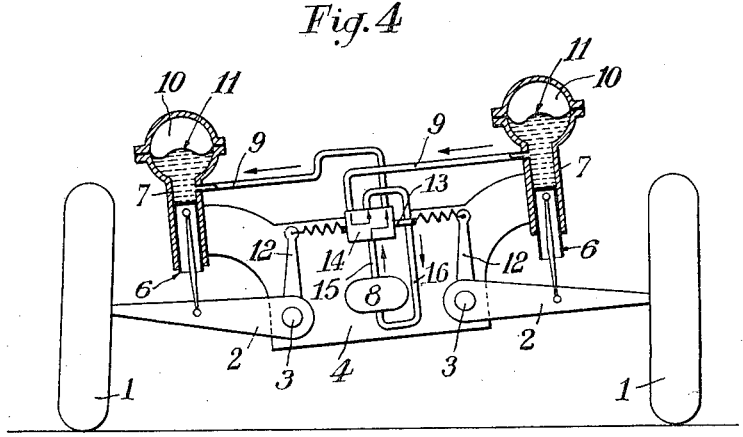

Figures 3 and 4 diagrammatically show an anti-rolling device with slide-valve enabling the delivery of the pump to be directed to one or the other of the hydraulic devices.

In Figure 3 which shows a suspension of the type of Figure 2, the arms 2 are fastened to a lever 12 acting on the slide 13 of the distributor slide-valve 14 connected to hydraulic devices 7 by the piping 9, and to the rotary pump 8, by the piping 15 and 16.

In the balanced position, the pump 8 delivers in the direction of the arrows through the piping 16 and 15 into the slide-valve 14.

When the balance is disturbed (Figure 4) the slide 13 moves in the slide-valve 14 while carrying along the liquid coming from the unloaded support to discharge in the direction of the arrows into the heavier loaded hydraulic device and thus restores the balance.

Figure 5:
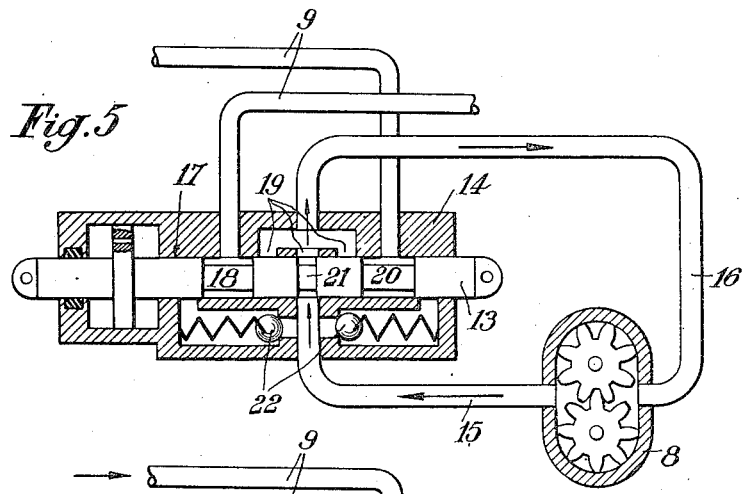
Figures 5 to 7 show how this slide-valve operates.
Figure 6:
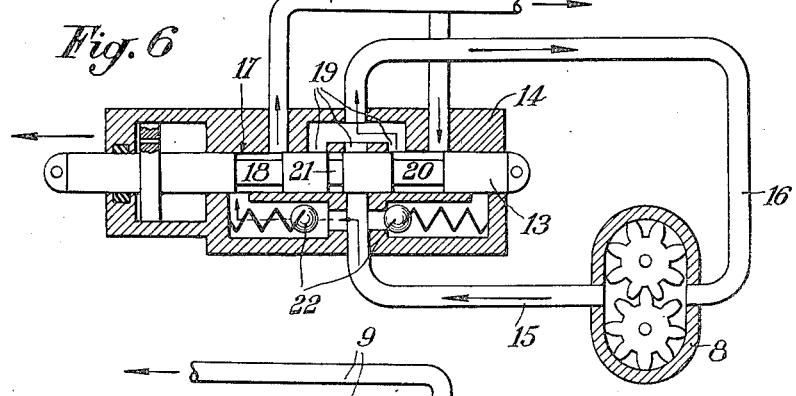
Figure 7:
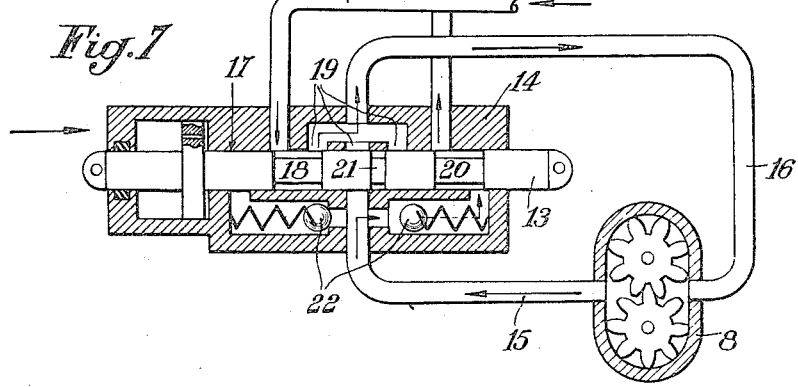

Figures 5 to 7 show the details of a slide-valve for regulating the fluid circuit.

This slide-valve 14 is traversed by the rod 13 which slides in the bore 17 and is provided with thinned parts 18, 21, 20 opposite the openings of the piping 9, 19 and 16 going respectively to the hydraulic shock-absorbers 7 and coming from the pump 8; the central part 21 by-passes the piping 19, 16, 15. The parts 18 and 20 by-pass the piping 9, 19, 16.

When the two wheels are equally loaded, the system is in balance and the pump 8 delivers as shown by the arrows (Figure 5).

Should a wheel be more heavily loaded, the rod 13 moving in the direction of the arrow by some suitable connection with the wheel concerned, a part of the delivery of the pump 8 goes in the direction of the arrow to deliver into the hydraulic device of the loaded wheel, whereas the unloaded hydraulic device delivers into the pump.

The circuit is inverted (Figure 7) if it is the other wheel that is loaded.

Calibrated poppet valves formed by balls 22 facilitate the restoring of the vehicle's balance.

What I claim is:

1. In a hydraulic stabilizing device for a vehicle having a frame, a pair of opposite wheels, and wheel suspension means for each of said wheels including a wheel-carrying member movably mounted on said frame, a pair of hydraulic motors acting respectively between said wheel-carrying members and said frame to move said members relative to the frame and thereby control the inclination of the vehicle, and a closed hydraulic system comprising said motors, a continuously running pump, fluid connections between said pump and said motors and a reversing valve in said connections and operative connections between said valve and said wheel-carrying members to reverse said valve upon predetermined movement of said members relative to the frame, said pump delivering fluid from one motor directly to the other depending on the position of said valve.

2. A stabilizing device according to claim 1, in which the connections between said valve and said wheel-carrying members comprise elastic connections.

3. In a hydropneumatic suspension and stabilizing system for a vehicle having a frame, a pair of opposite wheels, and wheel suspension means for each of said wheels including a wheel-carrying member movably mounted on said frame, a pair of hydropneumatic devices acting respectively between said wheel-carrying members and said frame to move said members relative to the frame and thereby control the inclination of the vehicle, each of said hydropneumatic devices comprising a cylinder containing gas and liquid and a piston operable in said cylinder, and a closed fluid system comprising said cylinders, a continuously running pump, fluid connections between said pump and cylinders and a reversing valve in said connections, and operative connections between said valve and said wheel-carrying members to reverse said valve upon predetermined movement of said members relative to the frame, said pump delivering fluid from one cylinder to the other depending on the position of said valve.

4. A suspension and stabilizing system according to claim 3, in which means is provided separating said liquid and gas in each of said cylinders.

5. A suspension and stabilizing system according to claim 4, in which said separating means comprises a flexible diaphragm dividing said cylinder into separate gas and liquid chambers.

References Cited in the file of this patent

UNITED STATES PATENTS

| | | |
|---|---|---|
| 2,279,120 | Hurley | Apr. 7, 1942 |
| 2,474,471 | Dolan | June 28, 1949 |
| 2,490,719 | Tank | Dec. 6, 1949 |
| 2,650,107 | Monnig | Aug. 25, 1953 |